United States Patent
Tripp et al.

(10) Patent No.: US 7,090,762 B2
(45) Date of Patent: Aug. 15, 2006

(54) METHOD OF PASSING ELECTRIC CURRENT THROUGH HIGHLY RESISTIVE ANODIC OXIDE FILMS

(75) Inventors: Terrance B. Tripp, Westborough, MA (US); Brian John Melody, Greer, SC (US); John Tony Kinard, Greer, SC (US); David Alexander Wheeler, Williamston, SC (US); Duane Earl Stenzinger, Simpsonville, SC (US)

(73) Assignee: Kemet Electronics Corp., Greenville, SC (US)

( * ) Notice: Subject to any disclaimer, the term of this patent is extended or adjusted under 35 U.S.C. 154(b) by 206 days.

(21) Appl. No.: 10/634,423

(22) Filed: Aug. 5, 2003

(65) Prior Publication Data

US 2005/0029114 A1 Feb. 10, 2005

(51) Int. Cl.
*C25D 11/02* (2006.01)
*C25D 9/02* (2006.01)

(52) U.S. Cl. .................. 205/234; 205/171; 205/172; 205/317; 205/322; 205/324; 205/332; 205/704

(58) Field of Classification Search .............. None
See application file for complete search history.

(56) References Cited

U.S. PATENT DOCUMENTS

| 4,812,951 A * | 3/1989 | Melody et al. ............. 361/504 |
| 4,910,644 A | 3/1990 | Ross et al. |
| 4,948,685 A * | 8/1990 | Ohsawa et al. ............. 429/213 |
| 5,720,903 A | 2/1998 | Wessling et al. |
| 6,274,061 B1 * | 8/2001 | Tamamitsu ................ 252/62.2 |
| 2003/0098240 A1 * | 5/2003 | Hesse et al. ................ 205/172 |

FOREIGN PATENT DOCUMENTS

GB 2 168 383 A 12/1984

* cited by examiner

*Primary Examiner*—Roy King
*Assistant Examiner*—William T. Leader
(74) *Attorney, Agent, or Firm*—J. Herbert O'Toole; Nexsen Pruet, LLC

(57) ABSTRACT

The metal oxide surface coating of an anodized valve metal may be made conductive under certain conditions so that conductive coatings can be electrolytically deposited on the surface of the oxide. When a dry polar aprotic electrolyte solution is used at a reduced temperature and a relatively high field is applied, the oxide ceases to be insulative. The process is reversible, meaning that there is no permanent change in the oxide.

11 Claims, 2 Drawing Sheets

METHOD OF PASSING ELECTRIC CURRENT THROUGH HIGHLY RESISTIVE ANODIC OXIDE FILMS

FIELD OF THE INVENTION

The invention relates to methods for reversibly converting valve metal oxides from insulating to conductive using specific solvents and temperatures.

BACKGROUND AND PRIOR ART

The insulating nature of anodic oxide films on the so-called valve metals has been known since the mid 1800's. These films were investigated systematically by Guntherschulze during the first 3 decades of the 20th century and the results are described in the work, *Electrolytkondensatoren*, by Guntherschulze and Betz (published by Verlag Von M. Krayn, Berlin, 1937). A more thorough and up to date work describing the subject is *Anodic Oxide Films*, by L. Young (published by Academic Press, London and New York, 1961).

When the more ideal examples of the valve metals, such as tantalum, are anodized in appropriate electrolytes, the amount of oxide growth is proportional to the current passed, with very small losses due to electronic leakage current through the anodic oxide. At a fixed electrolyte solution temperature, the thickness of the anodic oxide films on valve metals is proportional to the anodizing voltage. In 1955, Torrisi demonstrated that the anodic oxide film thickness at fixed voltage is proportional to the Kelvin (absolute) temperature of the anodizing solution and that for a given film thickness:

$$(T_1)(V_1) = (T_2)(V_2), \quad (1)$$

where T=Kelvin Temperature and V=Applied Voltage.

This relationship was found to hold over the range of 5–500 volts and 0–200° C. [A. F. Torrisi; *Journal of the Electrochemical Society*. 102, 176, (1955).]

In 1970, Dreiner and Tripp published a study of the anodizing kinetics of tantalum in aqueous alkali metal anodizing solutions in a pressure bomb over the temperature range of 0–250° C. [R. J. Dreiner and T. Tripp, *Journal of the Electrochemical Society*. 117, 858, (1970).] These researchers found that the oxide thickness (amount of anodic oxide produced) is proportional to the current passed up to about 170° C. Above 170° C. the anodic oxide was found to exhibit a significant electronic leakage current (i.e., current passing through the film without further, or at least efficient, film growth), probably due to oxygen migration from the oxide film to the tantalum substrate, resulting in a semi-conducting rather than insulating oxide film. The electronic leakage current results from a degradation of the insulating nature of the film In 1997, Melody, Kinard, and Lessner discovered the conditions under which non-thickness-limited (N-T-L) anodic oxide film growth takes place. In N-T-L film growth, the oxide grows thicker at 50+% current efficiency at fixed voltage while producing a non-porous, insulating film at temperatures in excess of about 150° C., N-T-L film growth, which is a major departure from traditional anodizing kinetics, is described in the following publications:

*Electrochemical and Solid State Letters*, Vol. 1, No. 3, pages 126–129, Title: "The Non-Thickness-Limited Growth of Anodic Oxide Films on Valve Metals", by Brian Melody, Tony Kinard, and Philip Lessner (1998)

*Journal of the Electrochemical Society*, Vol. 148, No. 9, pages B337–342, Title: "Non-Thickness-Limited Growth of Anodic Oxide Films on Tantalum", by Y. -M. Li and L. Young (2001)

U.S. Pat. Nos. 5,837,121, 5,935,408, 6,149,793, 6,235,181, and 6,267,861 assigned to the assignee of this invention, are relevant and are hereby incorporated by reference.

The insulating action of anodic oxide films is to act as highly resistive coatings but they are permanently damaged by the passing of current through them at voltages above the so-called withstanding voltage of the films. (The withstanding voltage, or voltage which the anodic oxide is capable of withstanding without permanent damage/high current flow, is usually equal to or less than the anodizing voltage.) Except under very unusual circumstances, such as those found in N-T-L anodizing, the application of voltages below the withstanding voltage of an anodic oxide film results in the passing of only very low currents through the insulating film.

For some applications, it is useful to be able to pass an electric current thorough the insulating anodic oxide film covering a valve metal anode body with the anode body biased with a positive voltage and without destroying the insulating nature of the oxide nor growing significant amounts of new anodic oxide. One useful effect which may be realized by the passage of current from a power supply through the anodic oxide coating on anodized valve metal anode bodies with the anode bodies biased positive is the electrolytic production of intrinsically conductive polymer films such as polypyrrole, polythiophene or polyaniline and derivatives thereof on the surfaces of the anodic oxide coatings. Such conductive polymer coatings covering anodic oxide films on valve metal anode bodies are useful for the production of electrolytic capacitors, resistors, switches, sensors, etc. Alternately, if the anodic oxide coating on the anodized valve metal body is biased positive and the oxide is rendered conductive per the methods of the present invention, then metal salts may be added to the electrolyte system and the anode bodies can be biased negative resulting in the passage of current through the anodic oxide coating on anodized valve metal anode bodies that can be utilized for the electrolytic plating of metals such as silver, gold, copper or zinc onto the surfaces of the anodic oxide coatings using a soluble salt. While the metal cations are attracted to the negatively biased conductive oxide, the halogens or other anions are repelled from the oxide surfaces. In short, the passage of the non-destructive, non-oxide forming current of the present through the oxide coatings on anodized valve metal anode bodies may be useful for various different electrochemical processes known to those in the art.

It is an objective of this invention to render the oxide of a valve metal conductive. It is a second objective of this invention to render the oxide of a valve metal reversibly conductive without denigrating from its insulative characteristics.

It is a third objective of this invention to be able to produce novel and more effective cathodes for capacitors.

It is yet another objective of this invention to produce sensors for specific chemical compounds and temperature sensitive switches.

These and other objectives can be met by placing an anodized valve metal in a solution which is an anhydrous, polar aprotic liquid system at a reduced temperature and using the oxidized valve metal as one electrode.

The paper on non-thickness-limited anodizing by Melody, Kinard, and Lessner, referenced above, establishes the role of hydroxyl groups (present in anodic oxide films) in the stabilization of these films, at least over the temperature range examined by the authors. The reversible nature of N-T-L anodizing, with its dependence on electrolyte solution water content, strongly suggests that the hydroxyl content of anodic oxide films is not constant, but may be reduced by the application of a high electric field (valve metal biased positive) under conditions which do not allow hydroxyl groups to enter the film as quickly as they are eliminated from the film (presumably through dissociation of protons from the oxygen atoms making up hydroxyl groups with rapid removal of the protons from the oxide due to the high electric field).

DETAILED DESCRIPTION OF THE INVENTION

Figure 1:
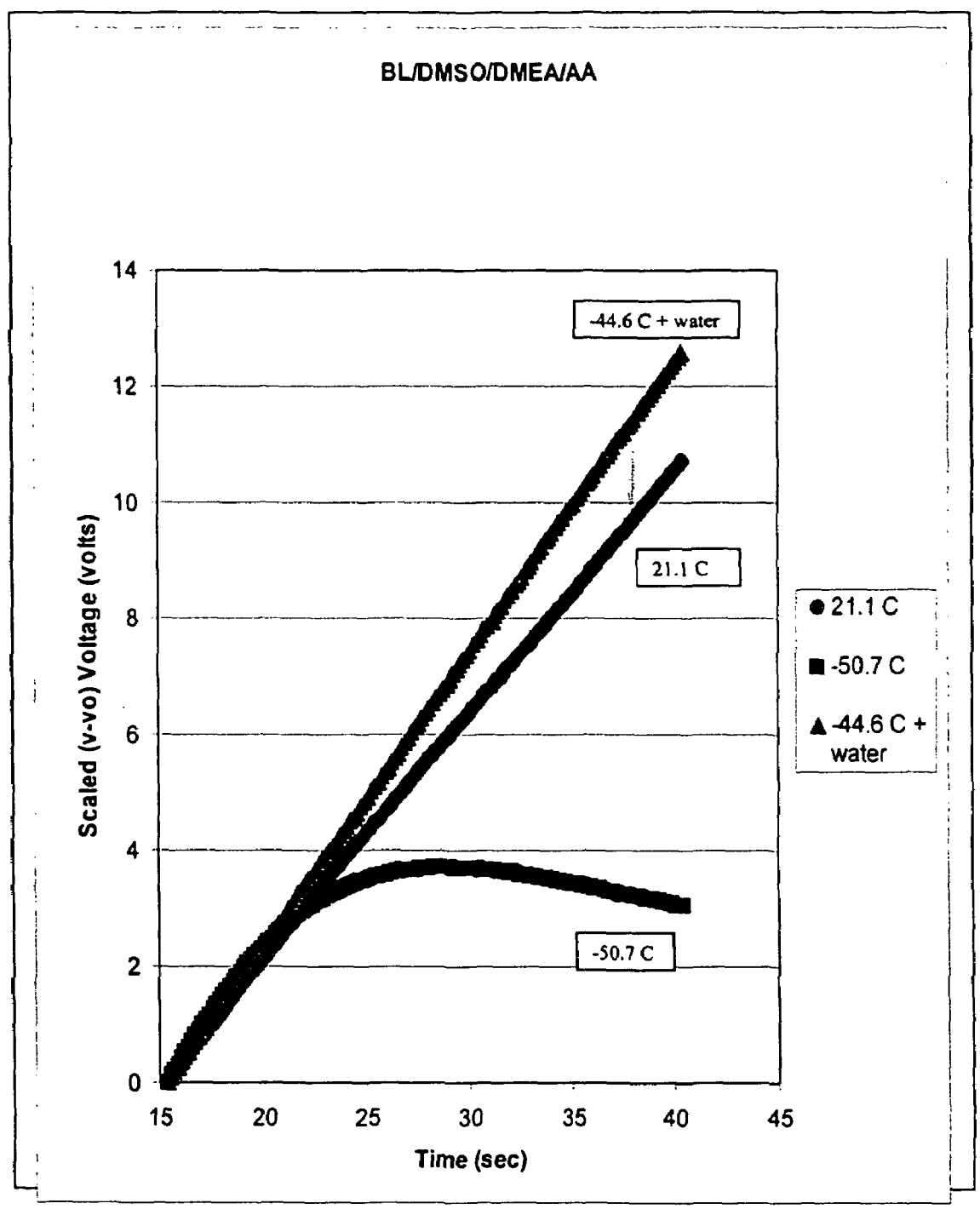
FIG. 1 is a plot of voltage vs. time for the data from Example 1.

We have found that the anodic oxide coatings on anodized valve metal objects may be made temporarily electrically conductive with the valve metal biased positive relative to an electrolyte solution in contact with the valve metal object without damage to the normal insulation resistance of the anodic oxide films and with minimal growth of additional anodic oxide. While not being bound by any theory, the oxide appears to have the characteristic properties of an n-type semiconductor.

The invention relates to all valve metals including but not limited to aluminum, tantalum, niobium and titanium. The effect is the result of the employment of a combination of: a low water content, polar, aprotic solvent electrolyte solution; a reduced temperature; and the application of a relatively high field.

By low water content is meant a solvent having preferably below 0.1 wt. % water as determined by standard tests such as a Karl Fischer titration. A test for polar, aprotic solvents is given in United Kingdom Patent Application No. GB 2168383A, by which polar, aprotic solvents are defined as that group of solvents which (either individually or in a admixture) may be mixed with 5 vol. % of concentrated (85%) phosphoric acid and which then exhibit little or no reaction upon the addition of ammonium carbonate or ammonium bicarbonate to the solvent/phosphoric acid solution. Unsuitable solvents for this invention evolve copious quantities of carbon dioxide gas upon the addition of ammonium carbonate to the solvent/phosphoric acid solution due to excessive proticity. Solvents which exhibit excessive proticity tend to react electrochemically and are therefore unsuitable for the purposes of this invention.

Reduced temperature, for the purposes of the present invention, is meant the temperature range from about −20° C. to about −60° C. preferably a temperature of −40° C. to −50° C. The temperature below which the process must be carried out in order to avoid damage to the anodic oxide and to avoid additional anodic oxide growth is dependent upon the nature of the ionogenic species present in the electrolyte. When an anionic species present is, for example, a monocarboxylic acid, such as acetic acid, the process may be carried out successfully (i.e., current may be passed through the anodic oxide without damage to the film and without significant additional anodic oxide growth with the valve metal biased positive relative to the electrolyte) at temperatures as high as −20° C. When the anionic material present is a dicarboxylic acid or similar polyfunctional species, the temperature must be reduced to −35° C. or −40° C. for successful results. In no case has a temperature below −50° C. been found to be necessary for success with the process when the water content of the electrolyte solution is below about 0.1 wt. % and the solvent(s) is a polar, aprotic solvent according to the above definition. Other acids which work well within this temperature range are the sulfonic acids such as benzene sulfonic acid, p-toluene sulfonic acid and naphthalene sulfonic acid.

An additional consideration of practical interest for the purposes of this invention is the uniformity of the current passed through the anodic oxide films. The uniformity of the current is, to a large degree, dependent upon the solution resistivity at the temperature of operation of the process. The lower the solution resistivity, the more uniformly the current is passed through the oxide. For the temperature range anticipated for the application of the present invention (i.e., −20° C. to −60° C. preferably −40° C. to −50° C.), we have found two solvent systems to give exemplary results. The first solvent is dimethyl formamide CAS Registry No. 68-12-2. Dimethyl formamide (or "DMF") freezes at −63° C. and complexes with many cations to yield electrolyte solutions having relatively high electrical conductivity for the amount of dissolved ionogen. The major disadvantage associated with the use of DMF for the purposes of the present invention is the relatively high toxicity of the material which is classified by EPA as a hazardous air pollutant. A low-toxicity alternative to the use of dimethyl formamide as the solvent system for the purposes of the present invention is described in U.S. Pat. No. 4,812,951, incorporated herein by reference. This patent describes the use of a mixed solvent system for the purpose of obtaining a much lower change in solution resistivity with temperature than can be obtained with an individual solvent of low toxicity over the desired temperature range of the present invention. This reduction in resistivity change versus temperature is accomplished by employing a solution containing approximately 1 part by volume of dimethyl sulfoxide (DMSO) to 3 parts by volume of co-solvent. Dimethyl sulfoxide forms complexes with cations, such as protonated amines, etc., resulting in a high degree of ionization of the dissolved ionogen. The best co-solvent for the purposes of the present invention has been found to be 4-butyrolactone. We have found that the resistivity of amine salt solutions in 25% DMSO and 75% 4-butyrolactone solutions exhibit only about twice the resistivity of the same concentration of the same ionogen in DMF at −40° C. and at least an order of magnitude lower resistivity than that obtained with other polar, aprotic solvents with no DMSO co-solvent. Thus, when minimal electrolyte solution toxicity is desired for the purposes of the current invention, a 25 vol. % DMSO/75 vol. % 4-butyrolactone solution is the solvent of choice due to the low toxicity, high conductivity, and low reactivity of electrolyte solutions in this solvent system under the conditions required to pass an electrical current through an anodic oxide coating on a valve metal without destroying the insulating properties of the anodic oxide nor growing a significant amount of additional anodic oxide.

EXAMPLE 1

In order to illustrate the effect of electrolyte temperature on anodic oxide electronic conductivity for the electrolyte solutions of the present invention, the following solution was prepared:

1.1 mole/liter acetic acid 1.1 mole/liter dimethyl ethanol amine

Solvent: 75 vol. % 4-butyrolactone 25 vol. % dimethyl sulfoxide

The above electrolyte solution was dried over molecular sieve beads until the water content was reduced to 0.1% or lower.

The dried electrolyte was contained in a stainless steel beaker surrounded by a circulating, chilled fluid having a very low vapor pressure. A thermocouple was introduced into the electrolyte solution in order to monitor the solution temperature. The beaker containing the electrolyte solution was contained within a "dry box", under a blanket of dry argon gas.

A group of 3 cm by 3 cm high purity tantalum sheet coupons were resistance-welded to 0.012 inch tantalum wires. The coupons were cleaned using a solution of sulfuric/nitric/hydrofluoric acid and were then vacuumed annealed at 1900° C. for 20 minutes.

Tantalum coupons from the above group were then anodized in the above solution at 1 mA/cm$^2$, for a period of 25 seconds at 21.1° C., −38.5° C. and −50.7° C. The voltage values were recorded electron results are shown graphically in FIG. 1. [Note: The current was initially applied at time equals about 15 seconds.]

FIG. 1 shows that the voltage rise curve at 21.1° C. is the usual, almost linear curve obtained with the traditional anodizing of tantalum and is only very slightly concave downwards due to the low water content of the electrolyte solution.

The voltage rise versus time at −38.5° C. is much less linear. The voltage rises only about ⅓ as much as at 21.1° C. during the last 10 seconds of current passage, indicating that the anodic oxide is growing progressively more electronically leaky (i.e., is passing a greater fraction of current as electronic current rather than as ionic current which produces additional oxide).

At −50.7° C., the voltage versus time curve is observed to pass through a maximum value below 4 volts and to decay to a lower value, indicating that virtually all of the current passing through the oxide is electronic current which is then available for electrochemical purposes in the solution.

EXAMPLE 2

In order to illustrate the importance of low electrolyte solution water content for the purpose of the present invention, approximately 1 wt. % water was added to the electrolyte solution of Example 1. A tantalum coupon (described above) was then anodized in this solution at a temperature of −44.6° C., as in Example 1.

Figure 2:
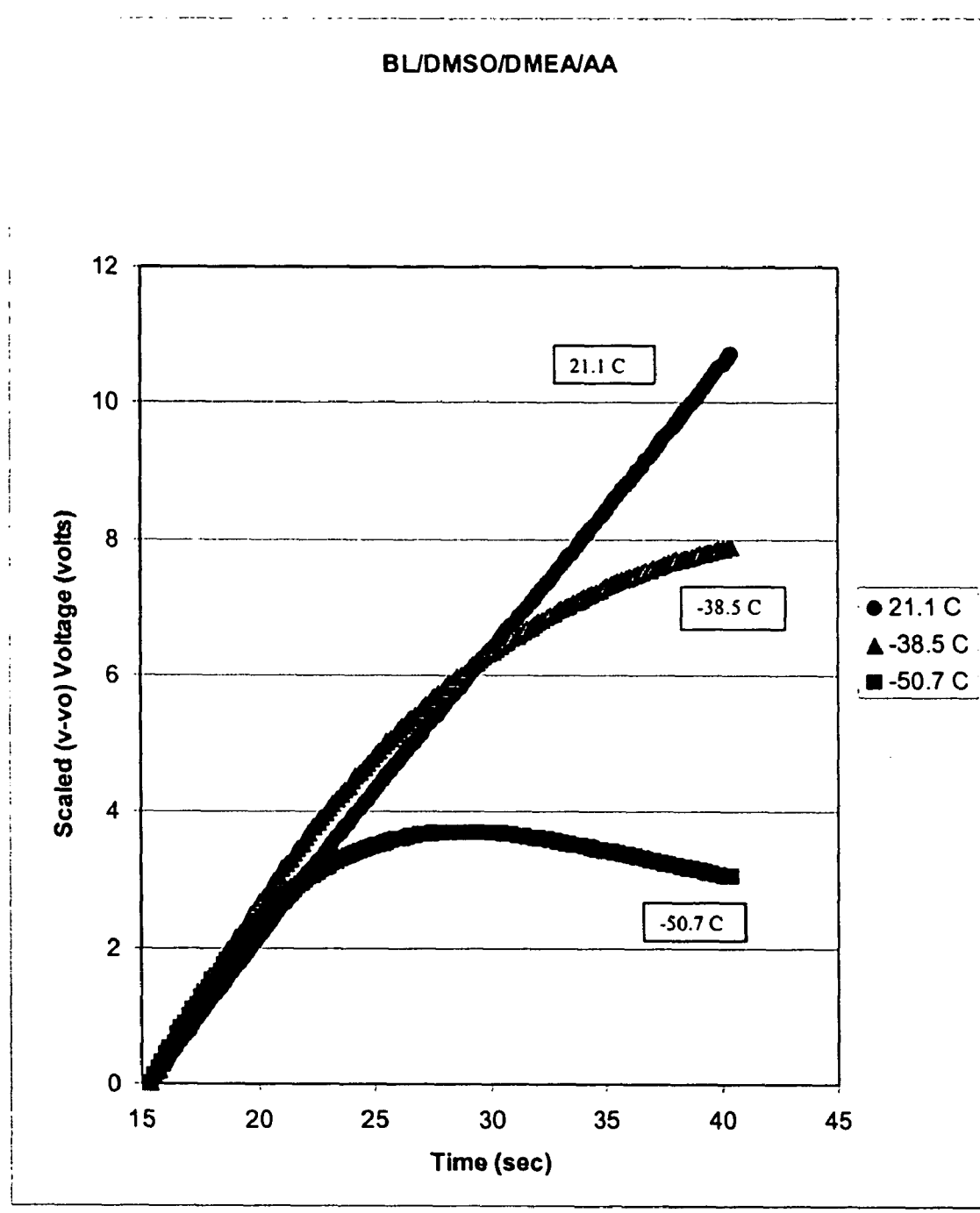
FIG. 2 is a plot of voltage vs. time for the data from Example 2.

The voltage versus time results for this test are presented in FIG. 2.

In spite of the low solution temperature, the voltage rose linearly with time, at a rate indicative of even higher anodizing efficiency than the original electrolyte solution (below 0.1 wt. % water) at 21.1° C. such that almost no electronic current was passed through the oxide. The current was virtually all ionic current consumed in anodic oxide growth in spite of the low temperature.

This illustrates the importance of preventing solution contamination by polar, protic solvents (water is a polar, protic solvent), especially water.

EXAMPLE 3

In order to illustrate the manner in which the present invention may be employed in practice to pass current through an already existing anodic oxide film on a valve metal for the purpose of affecting an electrochemical reaction on the surface of the anodic oxide film without changing the thickness of the anodic oxide film, the following demonstration was undertaken.

A powder metallurgy anode fabricated from Showa Corporation, S-706 tantalum powder, suspended from an imbedded tantalum wire was anodized, as a member of a lot of anodes, to 21 volts at 80° C., using the anodizing method and electrolyte described in U.S. Pat. No. 6,162,345.

The experiment was performed in a glovebox under a dry argon atmosphere. Said anode was then immersed in the following electrolyte solution:

450 ml, 4-butyrolactone 150 ml, dimethyl sulfoxide (The above solvent was dried over molecular sieve water absorbent until the water content was 0.043%+/−0.0095%, as indicated by Karl Fisher Aquametry.)

13 grams, dimethyl ethanolamine 20 grams, para-toluene sulfonic acid 6 grams, pyrrole (The above materials were stored as to have a minimal water content.)

The electrolyte solution was contained in a stainless steel beaker maintained in a chilled liquid bath using dry ice and a low freezing liquid to maintain temperature. A thermometer was immersed in the electrolyte solution. The beaker was equipped with parallel tantalum cathode plates spaced approximately 1 centimeter apart, suspended from above; the anode was immersed in the electrolyte, between the parallel plates. The electrolyte was stirred throughout the experiment using a magnetic stirrer in order to maintain temperature uniformity.

The electrolyte was maintained at −45° C.+/−5° C. for the initial portion of the experiment using ice/solvent composition such as that described in *J. Chem. Edu.* 77, 629 (2000). The −45° C. anodizing voltage equivalent of 21 volts at 80° C. is given (to a first approximation) by the Torrisi relation:

$$(T_1)(V_1)=(T_2)(V_2)$$

where $T_1$, T2 are the solution temperatures, in Kelvin, and $V_1$, $V_2$ are the voltages which result in equivalent oxide thickness then:

(353 Kelvin)(21 volts)=(228 Kelvin)(32.5 volts)

so, to a first approximation, the equivalent voltage for anodes anodized to 21 volts at 80° C. is 32.5 volts at −45° C.

Voltage was applied to the anode, in the low water content, polar aprotic solvent system containing pyrrole and supporting electrolyte in an attempt to produce polypyrrole on the anodic oxide surface without increasing the oxide thickness. The results are shown in Table 1.

TABLE 1

| | Electrical History | | |
|---|---|---|---|
| Time | Voltage | Current | Temperature |
| (on) | 32.2 V | 0.085 mA | −45° C. +/− 5° C. |
| 1 min | 32.2 V | 0.038 mA | −45° C. +/− 5° C. |

TABLE 1-continued

Electrical History

| Time | Voltage | Current | Temperature |
|---|---|---|---|
| 4 min | 32.2 V | 0.026 mA | −45° C. +/− 5° C. |
| 8 min | 32.2 V | 0.022 mA | −45° C. +/− 5° C. |
| Voltage increased to 33.1 volts. | | | |
| 1 min | 33.1 V | 0.037 mA | −45° C. +/− 5° C. |
| 2 min | 33.1 V | 0.036 mA | −45° C. +/− 5° C. |
| Voltage increased to 33.6 volts. | | | |
| 3 min | 33.6 V | 0.047 mA | −45° C. +/− 5° C. |
| 6 min | 33.6 V | 0.049 mA | −45° C. +/− 5° C. |
| 10 min | 33.6 V | 0.052 mA | −45° C. +/− 5° C. |
| 14 min | 33.6 V | 0.054 mA | −45° C. +/− 5° C. |
| Voltage increased to 34.0 volts. | | | |
| 1 min | 34.0 V | 0.071 mA | −45° C. +/− 5° C. |
| 4 min | 34.0 V | 0.072 mA | −45° C. +/− 5° C. |
| 5 min | 34.0 V | 0.073 mA | −45° C. +/− 5° C. |
| Voltage increased to 34.5 volts. | | | |
| 1 min | 34.5 V | 0.094 mA | −45° C. +/− 5° C. |
| 3 min | 34.5 V | 0.098 mA | −45° C. +/− 5° C. |
| 5 min | 34.5 V | 0.106 mA | −45° C. +/− 5° C. |
| 7 min | 34.5 V | 0.124 mA | −45° C. +/− 5° C. |
| 10 min | 34.5 V | 0.187 mA | −45° C. +/− 5° C. |
| 15 min | 34.5 V | 0.358 mA | −45° C. +/− 5° C. |
| 20 min | 34.5 V | 0.634 mA | −38° C. |
| 25 min | 34.5 V | 0.930 mA | −37° C. |
| 30 min | 34.5 V | 1.208 mA | −36° C. |
| off | | | |

There is generally observed an "induction period" at the minimum voltage which produces electronic conductivity through the anodic oxide film. The exact voltage for the onset of electronic conductivity was approached slowly in light of this generally observed induction period prior to more rapidly increasing current flow. Once the critical voltage was reached, there occurred an approximate 5 minute induction period prior to the onset of rapid current rise.

The anode was rinsed and examined with a binocular microscope. The outer portion of the anode was found to be coated with a thin layer of polypyrrole. The anode was cleaved in half and re-examined. The interior was found to be more heavily coated with polypyrrole, a jet black substance. The blue color of the anodic oxide was found to be unchanged under the polypyrrole layer, indicating that no additional oxide growth had taken place, therefore electrochemical deposition of polypyrrole was affected through the agency of the electronic current passed through the anodic oxide.

Further, it was noted that a heavier deposit was observed inside the anode body rather than on the external surface. The effect may be expanded by solution pH. As prepared, the electrolyte pH is approximately 6 (Hydrion® pH test paper). After voltage is applied, electrostatic attraction of the paratoluene sulfonic acid anion for the anode lowers the electrolyte pH between the parallel cathode plates to approximately 5 (Hydrion® pH test paper). The concentration of the anion within the anode pores further lowers the electrolyte pH within the pores. Electrolytic polypyrrole deposition has been demonstrated in our laboratory to take place more effectively (i.e., with higher current efficiency) at lower pH in low temperature solutions. In this case, the higher pH in the bulk electrolyte aids in deposition in the pores of the anodes. The exact pH is not critical to an understanding of this phenomenon. Commercial pH electrodes function poorly, if at all, in these dry low temperature aprotic solutions.

The invention has been described by reference to examples relating to anodes for capacitors. The scope of the invention is not so limited. The method may be applied to the manufacture of any device in which a separate, insulating material is required between two charged or conductive plates. Suitably doped, the resultant product may be a switch. Sensors may be prepared by lithographic printing or otherwise forming of a suitable conductive pattern on the surface of the oxide, typically after mashing part of the oxide coating and laying down a responsive metal or alloy. Modifications that may be obvious to one skilled in the art are encompassed within the scope and spirit of this invention.

What is claimed is:

1. A method for making an anodic oxide coating on a valve metal electrically conductive comprising:
   1) placing an anodized valve metal in a polar aprotic solvent having a water content below about 0.1 wt. % containing an ionogen;
   2) cooling the solvent to a temperature between −20° C. and −60° C.;
   3) inserting a counter electrode in said solvent; and
   4) connecting said valve metal and said counter electrode to a power supply so that the valve metal is biased positive and passing a current.

2. A method according to claim 1 wherein the valve metal is selected from the group consisting of tantalum, aluminum, niobium and titanium.

3. A method according to claim 1 wherein the polar aprotic solvent is selected from the group consisting of 1) dimethyl formamide and 2), about 25 vol % dimethylsulfoxide/75 vol % 4-butyrolactone.

4. A method according to claim 1 wherein said ionogen is selected from the group consisting of monocarboxylic acids, dicarboxylic acids, and sulfonic acids.

5. A method for coating an anodized valve metal oxide with a conductive polymer comprising the steps of:
   1) placing an anodized valve metal in a polar aprotic solvent having a water content below about 0.1 wt. % containing an ionogen;
   2) adding a monomer precursor for a conductive polymer;
   3) cooling the solvent to a temperature between −20° C. and −60° C.;
   4) inserting a counter electrode in said solvent; and
   5) connecting said valve metal and said counter electrode to a power supply so that the valve metal is biased positive and passing a current.

6. A method according to claim 5 wherein the monomer precusor is selected from the group consisting of pyrrole, thiophene, aniline and derivatives thereof.

7. A method according to claim 5 wherein the valve metal is selected from the group consisting of tantalum, aluminum, niobium and titanium.

8. A method according to claim 5 wherein the polar aprotic solvent is selected from the group consisting of 1) dimethyl formamide and 2) about 25 vol % dimethylsulfoxide/75 vol % 4-butyrolactone.

9. A method according to claim 5 wherein said ionogen is selected from the group consisting of monocarboxylic acids, dicarboxylic acids, and sulfonic acids.

10. A method for plating a metal on an anodized valve metal oxide comprising:

1) placing an anodized valve metal in a polar aprotic solvent having a water content below about 0.1 wt. % containing an ionogen;
2) cooling the solvent to a temperature between −20° C. and −60° C.;
3) inserting a counter electrode in said solvent; and
4) connecting said valve metal and said counter electrode to a power supply so that the valve metal is biased positive and passing a current until the oxide is conductive; and
5) connecting said valve metal and counter electrode to a power supply so that the valve metal is biased negative;

wherein a salt of a conductive metal is added at any time after step 1.

11. A method according to claim 10 wherein said salt is selected from the group consisting of a salts of silver, gold, copper and zinc.

* * * * *